March 25, 1924.

G. E. PETERSON

ADJUSTABLE RING GAUGE

Filed July 28, 1921

1,487,803

Inventor
G. E. Peterson
By Joseph K. Schofield
Attorney

Patented Mar. 25, 1924.

1,487,803

UNITED STATES PATENT OFFICE.

GUSTAVE E. PETERSON, OF WEST HARTFORD, CONNECTICUT, ASSIGNOR TO PRATT & WHITNEY COMPANY, OF NEW YORK, N. Y., A CORPORATION OF NEW JERSEY.

ADJUSTABLE RING GAUGE.

Application filed July 28, 1921. Serial No. 488,134.

*To all whom it may concern:*

Be it known that I, GUSTAVE E. PETERSON, a citizen of the United States, residing at West Hartford, in the county of Hartford and State of Connecticut, have invented certain new and useful Improvements in Adjustable Ring Gauges, of which the following is a specification.

This invention relates to ring gauges and particularly to a ring gauge which may be adjusted to compensate for wear.

The primary object of the invention is to provide a ring gauge with an adjustable member, the diameter of which may be slightly varied to adjust the gaging surface to compensate for wear.

Another object of the invention is to provide a split gaging ring within a conical seat in a supporting collar and to mount operating means in the collar for moving the split member along the conical seat so that it may be slightly closed and the diameter thereby slightly varied.

One of the advantages of the present invention is that it provides a ring gauge which may be cheaply manufactured and which may be compared from time to time with a standard plug gauge and adjusted to correspond thereto with facility and rapidity.

With these and other objects in view, my invention consists in the features of construction and operation set forth in the following specification and illustrated in the accompanying drawing.

In the accompanying drawing annexed hereto and forming a part of this specification, I have shown one embodiment of a ring gauge of small size but it will be understood that the invention can be otherwise embodied and that the drawing is not to be construed as defining or limiting the scope of the invention, the claims appended to this specification being relied upon for that purpose.

Figure 1:
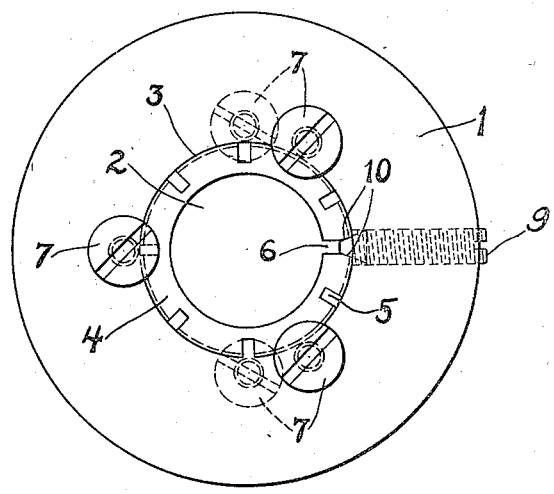
Figure 1 is a face view of the complete ring gauge.
Figures 2, 3, 4:
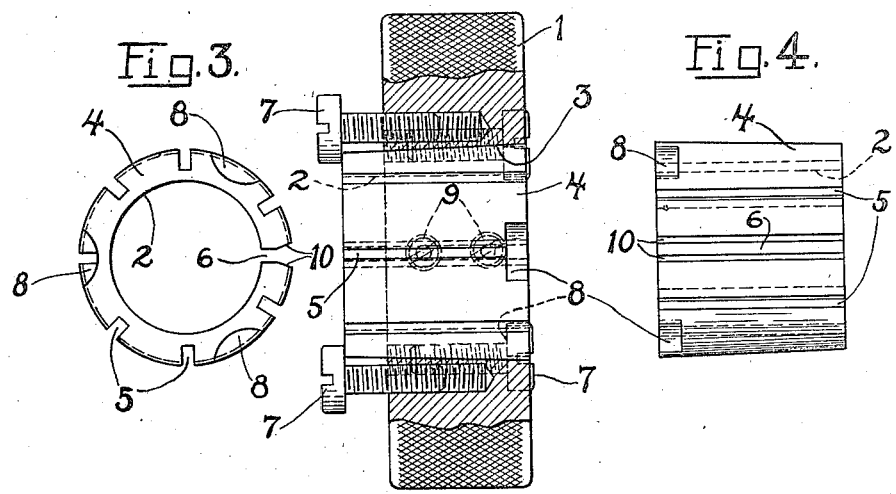
Fig. 2 is an edge view thereof partly in section.
Fig. 3 is an end view of the split ring forming the gaging member.
Fig. 4 is a side view thereof.

In the above mentioned drawing, I have shown but one form of the invention but it is to be understood that changes and modifications may be made within the scope of the appended claims without departing from the spirit of the invention.

Briefly, my invention in its broad aspect comprises the following principal parts; first, a collar forming the holding means for the gaging member provided with an internal conical surface; second, a gaging member preferably in the form of a split ring, the outer surface of the ring being adapted to fit the conical surface of the collar and the internal surface of which may be lapped to form the gaging surface; third, means for positioning the gaging member along the conical portion of the collar; fourth, means for expanding the ring to hold it against the conical surface of the collar.

Referring more in detail to the figures of the drawing, I provide a collar member 1 with a hole 2 providing an internal conical surface 3, the taper of which is very slight. Mounted in this conical hole of the collar is a gaging member 4, the outer surface of which is ground to correspond with the conical surface of the collar.

Preferably, this gaging member which is of considerable thickness is provided with narrow longitudinal slots 5 spaced about its circumference to facilitate expansion and contraction of the gaging member. This gaging member is also split at 6 as shown in the drawing so that positioning the gaging member along the conical seat will close or open the gap and vary the diameter of the internal cylindrical gaging surface.

To position the gaging member along the conical surface of the collar, I mount screws 7 in the collar adjacent and spaced about the conical hole so that flanges formed by the screw heads will abut against the end surfaces of the gaging member. Preferably, the gaging member and collar are countersunk as shown at 8 in the drawing so that the heads of the screws on one side of the gauge will lie within the face of the gauge and the gaging surface may be used to work up to or closely adjacent a collar or other construction.

Screws 9 are mounted radially in the collar and extend into the hole 2, the inner ends of these screws being tapered and adapted to abut against the ends 10 of the gaging member. By this means, the operator may be assured that the gaging member is in position in contact with the conical walls of the collar and that in the operation of gaging no expansion of the gaging member can take place.

In the operation of making this ring gauge, the parts are first made as shown and described and the gaging member inserted within the collar and adjusted by the screws 7 and 9 so that the inner cylindrical surface of the gaging member is of slightly less diameter than the desired dimension. This surface may then be carefully lapped in any well known manner until the diameter is exactly that desired. After repeated use of the gauge and after material wear has taken place on the gaging surface, it is only necessary to back off the screws 9 and the screws 7 on one side of the collar, then advance those on the opposite side a slight distance, thus forcing the gaging member along the taper to slightly reduce the diameter of the gaging surface. The screws 9 are thereafter tightened into place to hold the gaging member secure. In practice, it has not been found necessary to relap the gaging surface after each adjustment of this member but if that is at any time desirable it may readily be done by adjusting the gauge in the manner heretofore described to a diameter slightly less than the predetermined size and then carefully lapping the gaging surface in any well known manner.

What I claim is:

1. An adjustable ring gauge comprising in combination, a collar having a hole therethrough provided with a conical peripheral wall, a gaging member mounted within the said hole in said collar and in engagement with the said wall, and a plurality of screw threaded elements engaging the collar and member and adapted to act in opposite directions on the member whereby to adjust the member in the collar relative to the conical peripheral wall to vary the gaging dimensions of the member, the said elements also being operative to secure the member in its adjusted positions in the collar.

2. An adjustable ring gauge comprising in combination, a collar having a conical hole therethrough, a flexible gaging ring mounted within the hole of said collar, a plurality of screw threaded elements engaging the collar and ring and adapted to act in opposite directions on the ring whereby to adjust the ring in the hole to vary the gaging diameter thereof and to secure the ring in its adjusted position.

3. An adjustable ring gauge comprising in combination, a collar having a conical hole therethrough, a split gaging ring mounted within the said conical hole, a plurality of screw threaded elements engaging the collar and ring and adapted to act in opposite directions on the ring whereby to adjust the ring in the conical hole to vary the diameter thereof, and means threadedly engaging the collar and adapted to be engaged against the ring ends to expand the same against the collar, the said elements also being adapted to secure the ring against movement in the collar.

In testimony whereof, I hereto affix my signature.

GUSTAVE E. PETERSON.